(12) United States Patent
Spitzer et al.

(10) Patent No.: US 8,380,200 B1
(45) Date of Patent: Feb. 19, 2013

(54) METHODS AND SYSTEMS FOR FACILITATING MULTI-TECHNOLOGY HANDOVERS

(75) Inventors: Roy Leo Spitzer, Rockville, MD (US); Robert B. Kingsley, Jr., Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 225 days.

(21) Appl. No.: 12/832,864

(22) Filed: Jul. 8, 2010

(51) Int. Cl.
*H04W 36/00* (2009.01)
(52) U.S. Cl. ........ 455/436; 455/437; 455/438; 455/439; 455/552.1; 455/550.1; 370/331; 370/332
(58) Field of Classification Search .................. 455/436, 455/437, 438, 439, 552.1, 550.1, 553.1, 556.2; 370/331, 332
See application file for complete search history.

(56) References Cited

U.S. PATENT DOCUMENTS

| | | | |
|---|---|---|---|
| 5,157,661 A | 10/1992 | Kanai et al. | |
| 7,069,026 B2 | 6/2006 | McClure | |
| 7,149,524 B2 | 12/2006 | Reynolds | |
| 7,403,778 B2 | 7/2008 | Reynolds | |
| 7,450,942 B2 | 11/2008 | Cho et al. | |
| 7,496,364 B2 | 2/2009 | Hoghooghi et al. | |
| 7,558,544 B2 | 7/2009 | Kim et al. | |
| 7,583,635 B2 | 9/2009 | Kwak et al. | |
| 7,596,118 B2 * | 9/2009 | Kim et al. | 370/330 |
| 7,606,200 B2 | 10/2009 | Kwak et al. | |
| 7,649,867 B2 | 1/2010 | Kim et al. | |
| 7,653,392 B2 | 1/2010 | Ovadia et al. | |
| 7,664,501 B2 | 2/2010 | Dutta et al. | |
| 2005/0164706 A1 * | 7/2005 | Wakabayashi | 455/441 |
| 2006/0140150 A1 * | 6/2006 | Olvera-Hernandez et al. | 370/331 |
| 2007/0110009 A1 | 5/2007 | Bachmann et al. | |
| 2008/0305799 A1 * | 12/2008 | Zuniga et al. | 455/437 |
| 2011/0255516 A1 * | 10/2011 | Pawar et al. | 370/332 |

OTHER PUBLICATIONS

Jared Stein, "Survey of IEEE802.21 Media Independent Handover Services," http://www.cse.wustl.edu/~jain/cse574-06/ftp/handover/index.html (last modified: Apr. 24, 2006).
Raj Jain, "IEEE 802.21 Media Independent Handover (MIH)," http://www.cse.wustl.edu/~jain/cse574-08/ftp/j_emih2.pdf (2008).
InterDigital, Media Independent Handover, White Paper, Apr. 2009.
The Institute of Electrical and Electronics Engineers, Inc., "IEEE Standard for Local and Metropolitan Area Networks, Part 21: Media Independent Handover Services," IEEE Std 802.21-2008, dated Jan. 21, 2009.

* cited by examiner

*Primary Examiner* — Ajit Patel
*Assistant Examiner* — Khai M Nguyen

(57) ABSTRACT

A mobile station has a transmitter, a first receiver, and a second receiver, each of which can be configured to use a first radio access technology and a second radio access technology. The mobile station uses the transmitter and the first receiver to engage in a communication session via a serving base station that uses the first radio access technology. When a degradation in quality of the communication session is detected, the mobile station evaluates a target base station by transmitting a trial communication to the serving base station and receiving, through the second receiver, a trial response from a target base station. The target base station uses the second radio access technology. If the trial response is acceptable, the mobile station requests a handover of the communication session to the target base station. The mobile station may select the target base station from a multi-technology neighbor list.

15 Claims, 5 Drawing Sheets

METHODS AND SYSTEMS FOR FACILITATING MULTI-TECHNOLOGY HANDOVERS

BACKGROUND

A number of different standards for wireless communication of voice and/or data have been proposed. For example, various standards based on code division multiple access (CDMA) techniques have been proposed, such as the cdma2000 family of specifications advanced by the 3$^{rd}$ Generation Partnership Project 2 (3GPP2). The cdma2000 specifications have included various revisions to support high rate packet data air interface communications, an approach that is often referred to as Evolution Data-Optimized (EVDO). The Institute of Electrical and Electronics Engineers (IEEE) has issued various types of standards for wireless communications. For example, the IEEE 802.11 series of standards relate to wireless local area network communications and have been implemented in Wi-Fi wireless communication protocols. The IEEE 802.16 series of standards relate to wireless broadband communications and have been implemented in WiMAX wireless communication protocols. The 3$^{rd}$ Generation Partnership Project (3GPP) has developed the Universal Mobile Telecommunications System (UMTS) series of standards, as well as a set of enhancements that are described as Long Term Evolution (LTE).

In response to the growing diversity of wireless communication standards, the IEEE developed the 802.21 standard for "Media Independent Handover Services." The 802.21 standard defines mechanisms that can be used for handovers between heterogeneous IEEE 802 networks and handovers between IEEE 802 networks and non-IEEE 802 networks. However, the IEEE 802.21 standard leaves undefined many of the specifics for how to handle such handovers.

OVERVIEW

In a first principal aspect, an exemplary embodiment provides a method for a mobile station, the mobile station having a transmitter, a first receiver, and a second receiver. The mobile station uses the transmitter and the first receiver to engage in a communication session via a serving base station that uses a first radio access technology. The mobile station transmits through the transmitter a trial communication to the serving base station. The mobile station receives through the second receiver a trial response from a target base station that uses a second radio access technology. The trial response is a response to the trial communication. After receiving the trial response, the mobile station transmits through the transmitter a handover request to the serving base station. The handover request is configured to request a handover of the communication session from the serving base station to the target base station.

In a second principal aspect, an exemplary embodiment provides a system comprising data storage and a handover controller communicatively coupled to the data storage. The data storage contains base station information regarding a plurality of base stations that use a plurality of radio access technologies, including at least a first radio access technology and a second radio access technology. The handover controller is configured to (i) receive a request from a first base station that identifies a second base station and (ii) forward the request to the second base station, wherein the first and second base stations are identified in the base station information and the first base station uses the first radio access technology and the second base station uses the second radio access technology.

In a third principal aspect, an exemplary embodiment provides a mobile station comprising a transmitter, a first receiver, a second receiver, and a controller. The transmitter can be configured to use at least a first radio access technology and a second radio access technology. The first receiver can be configured to use at least the first radio access technology and the second radio access technology. The second receiver can be configured to use at least the first radio access technology and the second radio access technology. The controller is configured to control the first transmitter and the first receiver to use the first radio access technology for a communication session via a serving base station and to control the second receiver to use a second radio access technology to evaluate a target base station for a handover of the communication session.

DETAILED DESCRIPTION OF EXEMPLARY EMBODIMENTS

1. Introduction

Figure 1:
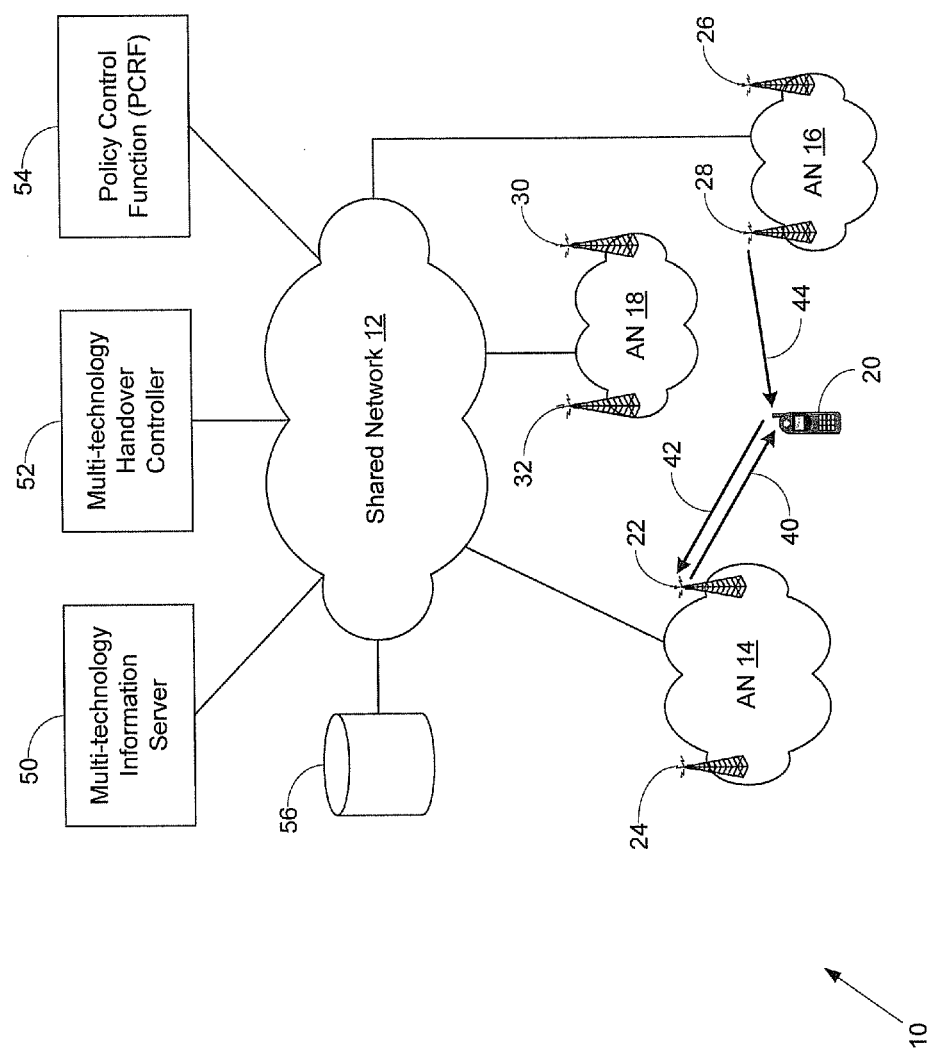
FIG. 1 is a block diagram of a wireless telecommunications network, in accordance with an exemplary embodiment.

Described herein are exemplary methods and systems that can facilitate multi-technology handovers. In an exemplary embodiment, a mobile station transmits a trial communication to a serving base station, to evaluate a target base station for handover of a communication session from the serving base station to the target base station, and receives a trial response from the target base station. The serving base station may use a first radio access technology, and the target base station may use a second radio access technology.

The evaluation process may be triggered by either the mobile station or the serving base station detecting a degradation in the quality of the communication session. In response to the quality degradation, the mobile station may request a multi-technology neighbor list based on its location. The multi-technology neighbor list identifies one or more neighboring base stations and may include base stations that use radio access technologies that are different than the first radio access technology used by the first serving base station. The mobile station may select the target base station from among the base stations identified in the multi-technology neighbor list, for example, by applying a selection algorithm. The mobile station may then confirm that selection by verifying that it is able to receive an adequate signal strength from the target base station.

The mobile station may receive a trial handover instruction from the serving base station, either in response to a trial handover request transmitted by the mobile station or at the initiative of the serving base station. In response to the trial handover instruction, the mobile station may transmit a trial communication to the serving base station, using the first radio access technology. The serving base station may forward the trial communication to the target base station, for example, via a multi-technology handover controller. In response to the trial communication, the target base station may transmit a trial response to the mobile station, using the second radio access technology. The mobile station may receive the trial response and may evaluate the trial response to determine whether it is acceptable. The evaluation may determine whether the trial response has characteristics (e.g., with respect to the content of the target response, latency, data rate, and signal quality) that indicate that the target base station is a suitable candidate for a handover of the communication session.

If the trial response is acceptable, then the mobile station may transmit a handover request to the serving base station, and a handover of the communication session from the serving base station to the target base station may be effected. If the trial response is not acceptable, then the mobile station may select an alternative target base station from the from among the base stations identified in the multi-technology neighbor list and evaluate the alternative target base station in a similar manner.

By using the first radio access technology to transmit the trial communication, the mobile station may beneficially use the same transmitter to both evaluate a target base station for a multi-technology handover and maintain the communication session with the serving base station until the mobile station is ready to effect the handover. This approach can also provide benefits with respect to the design of the mobile station.

For example, a mobile station might have a plurality of receivers (e.g., at least a first receiver and a second receiver) but only a single transmitter, with the receivers and the transmitter each being independently configurable to use any of a plurality of different radio access technologies. The mobile station may use the transmitter and the first receiver for a communication session with a serving base station using a first radio access technology. After identifying a target base station that uses a second radio access technology, the second receiver may be configured to use the second radio access technology to evaluate the target base station. In addition, if the mobile station has three or more receivers, the mobile station may use a plurality of receivers to evaluate a plurality of target base stations in parallel. By transmitting to the serving base station a trial communication that is forwarded to one or more target base stations, the transmitter can be involved in the process of evaluating one or more target base station while still maintaining the communication session using the first radio access technology.

2. Exemplary Wireless Telecommunications Network

FIG. 1 illustrates a wireless telecommunications network 10 in which exemplary embodiments may be employed. Wireless telecommunications network 10 may include a shared network 12 that is communicatively coupled to a plurality of access networks, exemplified in FIG. 1 by access networks (ANs) 14, 16, and 18. Shared network 12 could be, for example, a packet-switched network or a circuit-switched network. ANs 14, 16, and 18 could be cellular wireless networks, wireless local area networks, or other communication networks that enable communication devices, such as mobile station 20, to access shared network 12.

Mobile station 20 could be a wireless telephone, wireless personal digital assistant, wirelessly-equipped handheld or laptop computer, or other wireless communication device. Mobile station 20 may access shared network 12 in order to engage in a communication session with one or more endpoints. The communication session could be, for example, a voice call with one or more telephony devices, such as landline stations and/or mobile stations. Alternatively, the communication session could be a data call with one or more endpoints, such as voice-over-packet (VoP) communication devices, e-mail servers, instant messaging servers, Web servers, gaming servers, and/or streaming media servers. The data call could involve the exchange of packets containing voice, text, data, video, or other media.

Each access network may include one or more base stations. For purposes of illustration, FIG. 1 shows AN 14 with base stations 22 and 24, AN 16 with base stations 26 and 28, and AN 18 with base station 30 and 32. Each base station may have a wireless coverage area, such as a for example, a femtocell, picocell, microcell, or macrocell. Alternatively or additionally, the wireless coverage area of a base station could be directionally divided into a plurality of sectors. Within its wireless coverage area, the base station may be able to wirelessly communicate with one or more wireless communication devices (e.g., mobile station 20) using a radio access technology, such as 1xRTT CDMA, EVDO, GSM/GPRS, IEEE 802.11 (WiFi), IEEE 802.16 (WiMAX), UMTS, or LTE. Although FIG. 1 shows shared network 12 communicatively coupled to three access networks, each with two base stations, it is to be understood that shared network 12 could be communicatively to a greater or fewer number of access networks, and each access network could include any number of base stations.

Different access networks may use different radio access technologies. For example, AN 14 may use a first radio access technology, AN 16 may use a second radio access technology, and AN 18 may use a third radio access technology. Mobile station 20 may be able to communicate using different radio access technologies. For example, mobile station 20 may be able to communicate with base station 22 in access network 14 using the first radio access technology and with base station 28 in access network 16 using a second radio access technology. Such communications may include forward link communications from the base station to the mobile station and/or reverse link communications from the mobile station to the base station. For example, FIG. 1 shows mobile station 20 in communication with base station 22 via a forward link 40 and a reverse link 42 and in communication with base station 28 via a forward link 44.

A mobile station, such as mobile station 20, may engage in a communication session via one or more base stations and/or access networks. For example, mobile station 20 may engage in a communication session via a serving base station, such as base station 22 in access network 14. During the communication session, mobile station 20 may start to move out of the wireless coverage area provided by base station 22. In order to maintain the communication session, mobile station 20 and/or base station 22 may request a handover of the communication session to a target base station. The target base station could be another base station in access network 22 (e.g., base station 24). Alternatively, the target base station could be a base station in another access network, such as base station 28 in access network 16. Thus, the target base station may use a different radio access technology than the serving base station. Nonetheless, a multi-technology handover of the communication session from a serving base station that uses a first radio access technology (e.g., base station 22 in access network 14) to a target base station that uses a second radio access technology (e.g., base station 28 in access network 16) may be effected—potentially with little or no interruption as perceived by a user of mobile station 20.

To support communications over the different radio access technologies used by the various access networks communicatively coupled to shared network 12, wireless telecommunications network 10 may include a multi-technology information server 50, a multi-technology handover controller 52, and a policy control function (PCRF) entity 54. Multi-technology information server 50 may have access to one or more data stores, such as database 56, that store information regarding one or more of the access networks communicatively coupled to shared network 12. For example, database 56 may store information regarding access networks 14, 16, and 18. For each access network, such information may include one or more of the following: (a) the type of radio access technology used in the access network; (b) the wireless service provider that operates the radio access network; (c) roaming agreements and/or policies that relate to the radio access network; (d) whether the access network is a public network or private network; (e) the locations of the base stations in the access network; (f) an identification of each base station (e.g., identifying information that enables a wireless device communication device to acquire a pilot signal or beacon that is transmitted by a specific base station); (g) the frequencies, bandwidths, data rates, transmit power levels, number of channels, types of channels, FDD/TDD options, and QoS levels supported by each base station; (h) the wireless coverage area provided by each base station; (i) current status information for each base station, such as a base station's operational status and available capacity to support additional devices or communication sessions. It is to be understood that the above-described info nation is exemplary only, as database 56 may store other or additional types of information regarding access networks and/or the base stations in each access network.

Multi-technology information server 50 may be configured to access database 56 and provide selected information in response to requests received via shared network 12. Such requests may include neighbor list requests from mobile stations, such as mobile station 20. A neighbor list request may request information regarding base stations that are located in the vicinity of a specified location, i.e., base stations that may be within a communication range of the specified location.

For example, mobile station 20 may determine a current location using the Global Positioning System (GPS) or other location-determination technology and transmit to multi-technology information server 50 a neighbor list request that includes the current location. In response to the neighbor list request, multi-technology information server 50 may generate a neighbor list from the information contained in database 56 and transmit the neighbor list to mobile station 20. The neighbor list may identify one or more base stations that neighbor the mobile station's current location and may include information regarding the identified base stations (e.g., the radio access technology used by each base station) that may enable mobile station 20 to select one of the identified base stations as a target base station for a handover.

For example, if mobile station 20 is currently being served by base station 22 in AN 14, the neighbor list provided by multi-technology information server 50 may identify base station 28 in AN 16 and base station 32 in AN 18 as neighboring base stations. The neighbor list may also specify the location, radio access technology, service provider, transmit power level, and/or other information regarding base station 28 and base station 32. As described in more detail below, mobile station 20 may then use the information in the neighbor list to select a target base station (e.g., base station 28) to evaluate for a handover of a communication session from serving base station 22. Mobile station 20 may select a target base station from among the base stations identified in the neighbor list by applying a selection algorithm provisioned in mobile station 20. Alternatively, mobile station 20 may select a target base station in consultation with PCRF 54. For example, mobile station 20 may transmit a selection request to PCRF 54. The selection request may include some or all of the information contained in the neighbor list and/or other information, such as the mobile station's current location. The PCRF 54 may respond with an identification of a target base station. The response from PCRF 54 may also include rules or policies for using the target base station.

Multi-technology handover controller 52 may support handovers between access networks that use different radio access technologies. For example, multi-technology handover controller 52 may support a handover from base station 22 in AN 14 to base station 28 in access network AN 16 by routing messages exchanged between base stations 22 and 28. To support this routing function, multi-technology handover controller 52 may use information contained in database 56. For example, multi-technology handover controller 52 may receive a message from base station 22 that identifies base station 28 as the intended recipient. Multi-technology handover controller 52 may then access database 56 to determine how to route the message so that it reaches base station 28. In addition to base stations, multi-technology handover controller 52 may communicate with other network elements, such as relays for fixed or mobile wireless access points.

Multi-technology handover controller 52 may also perform functions in addition to the routing function described above. For example, multi-technology handover controller 52 may translate between technology-specific parameters in order to provide inter-working between different types of radio access networks. Thus, multi-technology handover controller 52 may translate between QoS parameters used by one type of radio access technology and QCI parameters used by another type of radio access technology. The parameters translated by multi-technology handover controller 52 may include Layer 1, Layer 2, and/or Layer 3 parameters.

Although FIG. 1 shows multi-technology information server 50, multi-technology handover controller 52, PCRF 54, and database 56 as separate network elements that are communicatively coupled with one another via shared network 12, it is to be understood that some or all of these network elements could be integrated together. As one example, database 56 could be part of multi-technology information server 50. As another example, the functions of multi-technology information server 50 and multi-technology handover controller 52 could be integrated together in one network element (e.g., a multi-technology support node). Other variations are also possible.

It is also possible that different wireless service provides may use different multi-technology handover controllers. As a result, multiple multi-technology handover controllers may work together to support handovers between radio access networks operated by different wireless service providers. Thus, while FIG. 1 shows only one multi-technology handover controller, wireless telecommunications network 10 may include a plurality of multi-technology handover controllers.

3. Exemplary Mobile Station

Figure 2:
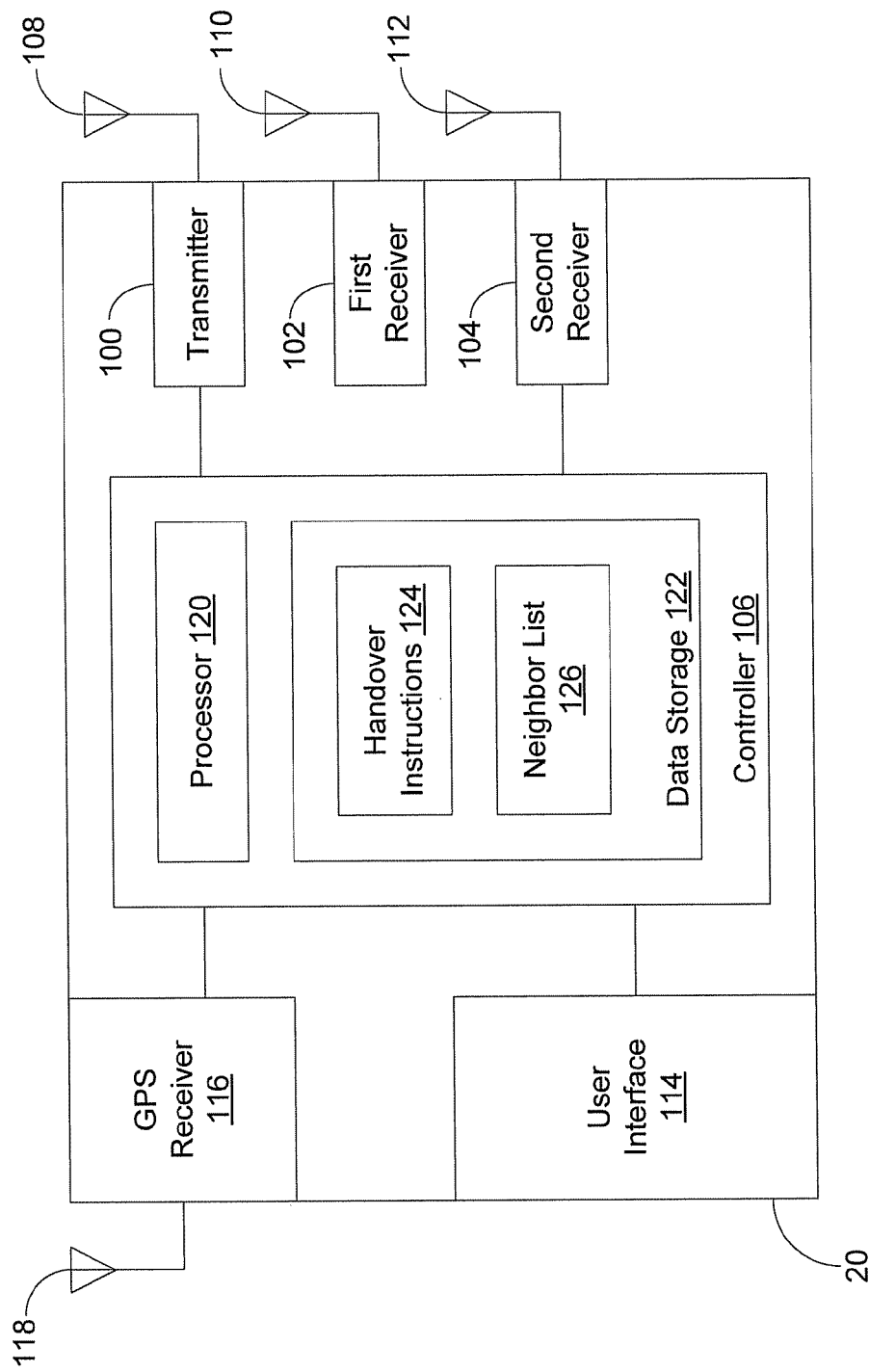
FIG. 2 is a block diagram of a mobile station, in accordance with an exemplary embodiment.

FIG. 2 illustrates an exemplary configuration of mobile station 20. In this exemplary configuration, mobile station 20 includes a transmitter 100, a first receiver 102, and a second receiver 104, all of which are controlled by a controller 106.

Transmitter 100 may transmit wireless signals via an antenna 108. First receiver 102 and second receiver 104 may receive wireless signals via antennas 110 and 112, respectively. Although FIG. 2 shows mobile station 20 with a separate antenna for each of transmitter 100 and receivers 102 and 104, these elements could alternatively use a greater or fewer number of antennas. For example, transmitter 100, first receiver 102, and second receiver 104 could share a single antenna.

In an exemplary embodiment, transmitter 100 can be configured to transmit wireless communications (e.g., voice, data, or other media) using any of a plurality of radio access technologies. Similarly, each of receivers 102 and 104 could be configurable to receive wireless communications using any of a plurality of different radio access technologies. For example, transmitter 100 and receivers 102 and 104 could each be independently software-programmable to use either a first radio access technology or a second radio access technology, under the control of controller 106.

Controller 106 may be communicatively coupled to a user interface 114. User interface 114 may support auditory, visual, and/or tactile communication with a user of mobile station 20. For example, user interface 114 may include display screen for displaying text, graphics, and/or video to a user. The display screen may include a touch screen for receiving input from the user. Alternatively or additionally, user interface 114 may include a keypad, buttons, or other controls to receive input from the user. User interface 114 may also include a microphone and speaker to receive voice communications from the user and to convey voice communications from the user. Through use of user interface 114, a user of mobile station 20 may be able to engage in a communication session, such as a voice call or a data call, via one or more of transmitter 100, first receiver 102, and second receiver 104.

Mobile station 20 may also be able to determine its location using a wireless location-determination technology, such as GPS. Thus, mobile station 20 may include a GPS receiver 116 communicatively coupled to controller 106. GPS receiver 116 may receive GPS signals through a GPS antenna 118. Mobile station 20 may determine its location based on the GPS signals received by GPS receiver 116, either on its own or by communicating with a position determining entity (PDE) or other network element.

Controller 106 could be implemented by software, firmware, and/or hardware. In an exemplary embodiment, controller 106 includes a processor 120 and data storage 122. Data storage 122 may include volatile and/or non-volatile memory. Data storage 122 may store software program instructions that when executed by processor 120 control the functioning of mobile station 20.

For example, data storage 122 may store handover instructions 124. As described in more detail below, handover instructions 124 may define procedures for determining when to evaluate a possible handover of a communication session, for selecting a target base station for the handover, for evaluating the suitability of the target base station for the handover, and for effecting the handover of the communication session from a serving base station to the target base station. Handover instructions 124 may support a multi-technology handover, i.e., a handover from a serving that uses a first radio access technology to a target base station that uses a second radio access technology. Handover instructions 124 may provide for the selection of a target base stations from among a plurality of base stations identified in a neighbor list 126, which may be stored in data storage 122. Neighbor list 126 could be a multi-technology neighbor list that identifies a plurality of neighboring base stations and a plurality of radio access technologies used by the plurality of neighboring base stations.

Although FIG. 2 illustrates mobile station 20 with two receives (first receiver 100 and second receiver 102), it is to be understood that mobile station 20 could include more than two receivers. This may allow mobile station 20 to use one receiver to maintain a communication session with a serving base station while using multiple receivers to receive signals from multiple target base stations for a potential handover. By evaluating multiple target base stations concurrently, mobile station 20 may be able to make better handover decisions and may be able to find a suitable base station for handover more quickly.

4. Exemplary Multi-Technology Handover Methods

Figure 3:
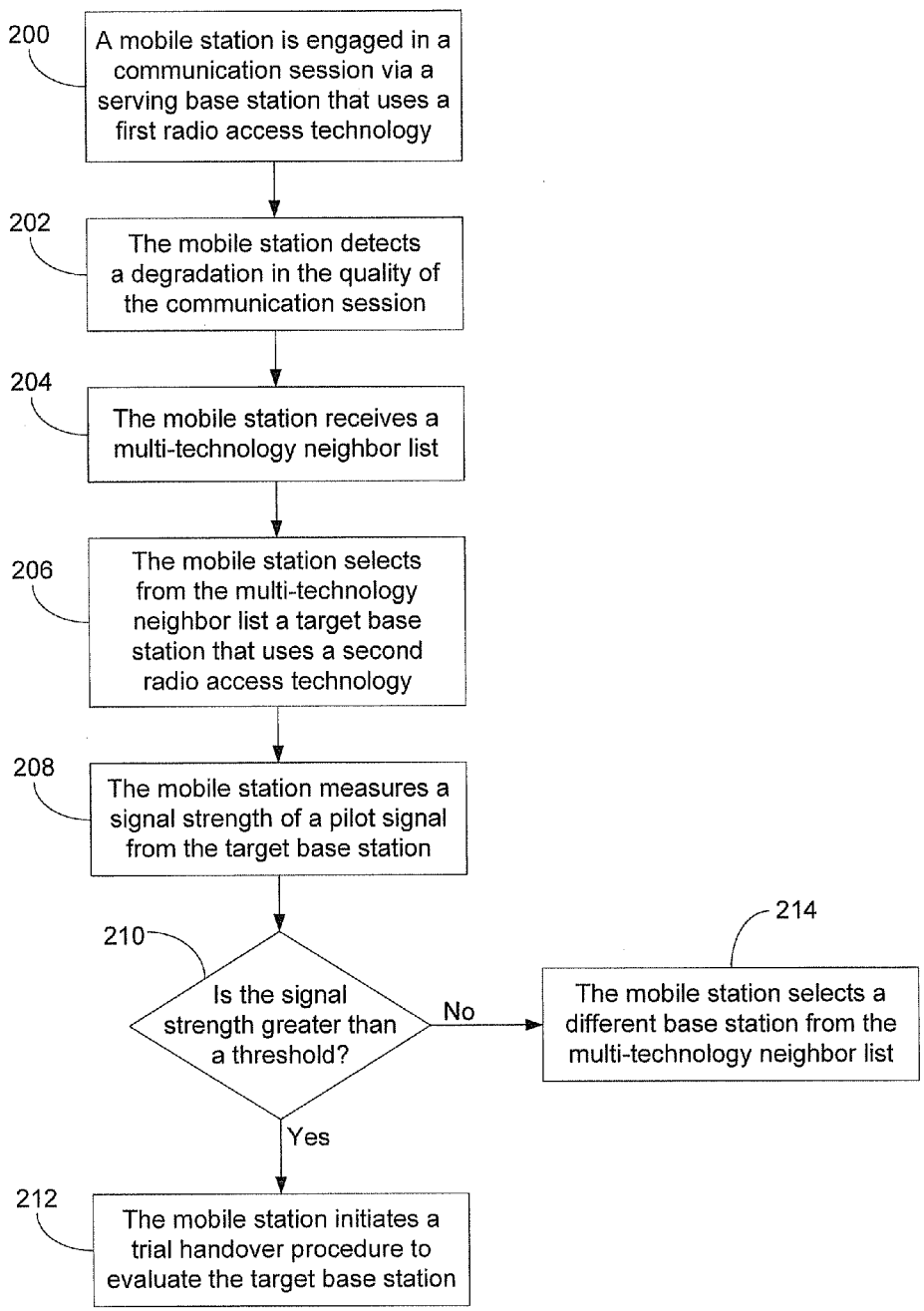
FIG. 3 is a flow chart illustrating a first part of a multi-technology handover method, in accordance with an exemplary embodiment.
Figure 4:
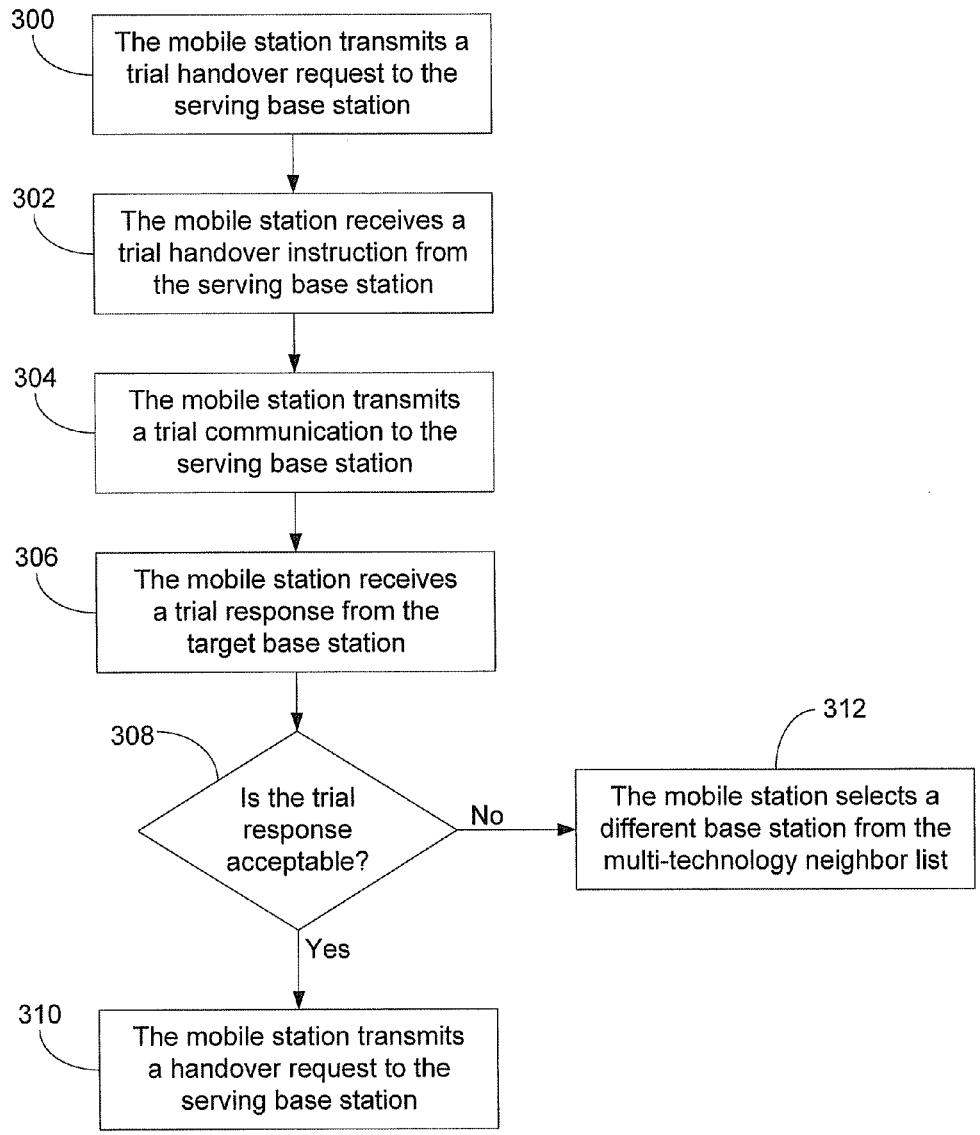
FIG. 4 is a flow chart illustrating a second part of the multi-technology handover method of FIG. 3, in accordance with an exemplary embodiment.

FIGS. 3 and 4 are flow charts illustrating an exemplary method for selecting and evaluating a target base station for a multi-technology handover. This exemplary method is described with reference to the configuration of wireless telecommunications network 10 shown in FIG. 1 and the configuration of mobile station 20 shown in FIG. 2. It is to be understood, however, that other configurations could be used.

With reference to FIG. 3, the process may begin when a mobile station (e.g., mobile station 20) is engaged in a communication session via a serving base station (e.g., base station 22) that uses a first radio access technology, as indicated by block 200. With reference to FIG. 2, mobile station 20 may transmit signals using transmitter 100 and receive signals using first receiver 102 for the communication session. Thus, at this point, transmitter 100 and first receiver 102 may be configured to use the first radio access technology.

At some point, the mobile station may detect a degradation in the quality of the communication session, as indicated by block 202. The degradation could be detected in various ways. In one approach, the mobile station might detect a decrease in signal-to-noise ratio or carrier-to-noise ratio of a signal transmitted by the serving base station. In another approach, the mobile station may detect an increase in the error rate, such as a frame error rate, in the data that the mobile station receives for the communication session. In still other approaches, the mobile station may detect changes in other quality metrics, such as an increase in latency or jitter.

In addition to a degradation in quality, a multi-technology handover process could be triggered by other circumstances. For example, if the user of the mobile station requests a communication service that cannot be supported by the serving base station (e.g., because of bandwidth or data rate requirements), then a multi-technology handover process may be initiated. The serving base station may also force a handover, for example, because of preemption by higher-priority traffic or devices, resource limitations, or to off-load traffic (for purposes of load balancing or in order to prepare for a shut down of the serving base station).

The mobile station may also receive a multi-technology neighbor list, as indicated by block 204. The multi-technology neighbor list may identify a plurality of base stations that neighbor the serving base station, including base stations that use different radio access technologies than the serving base station. The multi-technology neighbor list may also include various types of information for each base station in the list, such as the radio access technology used by the base station, the service provider associated with the base station, signal strengths transmitted by the base station, frequencies used by the base station, bandwidths, data rates, channels, or types of services supported by the station, the geographic location of the base station, a description of the coverage area provided by the base station, and/or other information.

The mobile station may receive the multi-technology neighbor list either before or after detecting the degradation in quality of the communication session. For example, in response to detecting the degradation in quality, the mobile station may transmit a neighbor list request to an information service (e.g., multi-technology information server 50). The neighbor list request may include the mobile station's current location, such as a location determined using GPS. The mobile station may then receive the multi-technology neighbor list in response to the neighbor list request. Alternatively, the mobile station might receive the multi-technology neighbor list before detecting the degradation in quality. For example, the mobile station may receive the multi-technology neighbor list periodically, rather than in response to a specific request.

The mobile station may select, from among the base stations identified in the multi-technology neighbor list, a target base station (e.g., base station 28) for a handover of the communication session, as indicated by block 206. In this example, the mobile station selects a target base station that uses a second radio access technology. It is to be understood, however, that in other cases, the mobile station may select a target base station that uses the same radio access technology as the serving base station.

The mobile station may select the target base station by applying a selection algorithm that takes a number of factors into account. One such factor could be proximity. Thus, everything else being equal, the selection algorithm may select a base station that is closest to the mobile station's current location. However, the selection algorithm may also take the radio access technology into account. For example, the selection algorithm may favor certain radio access technologies over others, such as "4G" technologies over "3G" technologies. The selection algorithm could also take cost into account. In particular, there may be different costs associated with using different neighboring base stations depending on, for example, the particular wireless service provider operating the base station and/or the ownership of the base station.

In addition to location and cost, the selection algorithm could also consider other factors. For example, the selection algorithm may consider the time of day, user privileges, and/or the mobile station's current environment (e.g., the mobile station is being used in a work environment or non-work environment).

It is to be understood that the mobile station might select the target base station on its own, or the mobile station may consult with one or more other network elements to make the selection. For example, the mobile station may query PCRF 54 to obtain a selection of the target base station. The query may include some or all of the information from the multi-technology neighbor list.

The mobile station may also select more than one base station at this time. For example, the mobile station may generate a prioritized list of a plurality of candidate base stations for a handover of the communication session. In that case, the mobile station may first evaluate the highest-priority candidate base station in the list as the target base station.

To begin evaluating the target base station for its suitability for a handover of the communication session, the mobile station may measure a signal strength of a pilot signal from the target base station, as indicated by block 208. With reference to FIG. 2, mobile station 20 may configure second receiver 104 to use the second radio access technology that is used by the target base station. Mobile station 20 may then use second receiver 104 to receive the pilot signal from the target base station, while still use transmitter 100 and first receiver 102 for the communication session with the serving base station.

The mobile station may compare the target base station's signal strength with a threshold, as indicated by block 210. If the signal strength of the target base station is greater than the threshold, then the mobile station may initiate a trial handover procedure to evaluate the target base station, as indicated by block 212 (and as described in more detail below with reference to FIG. 4). If not, then the mobile station may select a different base station from the multi-technology neighbor, as indicated by block 214. For example, if the mobile station has already generated a prioritized list of candidate base stations, the mobile station may select the next candidate base station in the list.

FIG. 4 illustrates an exemplary trial handover procedure that the mobile station may then use to evaluate the target base station. The trial handover procedure may begin when the mobile station transmits a trial handover request to the serving base station, as indicated by block 300. The trial handover request may, for example, identify the target base station and may request the serving base station to engage in a trial handover with the target base station.

In response to the mobile station's trial handover request, the serving base station may determine whether the target base station is available for a trial handover. If the target base station is available, the serving base station may transmit a trial handover instruction to the mobile station. The mobile station may receive the trial handover instruction from the serving base station, as indicated by block 302. The trial handover instruction may instruct the mobile station to begin a trial handover to the target base station. As described below, the trial handover is not an actual handover of the communication session with which the mobile station is engaged via the serving base station. Instead, the trial handover involves one or more trial communications transmitted by the mobile station and/or received by the mobile station that are intended to test the acceptability of the target base station for a handover of the communication session.

In response to the trial handover instruction, the mobile station may transmit a trial communication to the serving base station, as indicated by block 304. The trial communication could be, for example any communication that would serve to elicit an expected response from the target base station that the target base station would transmit to the mobile station. In one approach, the trial communication is a relatively short communication (e.g., with a time stamp but little or no data) that the mobile station uses to "ping" the target base station. In another approach, the trial communication provides information regarding the communication session being requested by the mobile station. For example, the trial communication may include requested parameters, such as frequencies, bandwidths, or data rates.

Since the mobile station's transmitter (e.g., transmitter 100) may be configured to use the first radio access technology used by the serving base station, the mobile station transmits the trial communication to the serving base station rather than to the target base station. The serving base station may forward the trial communication to the target base station, for example, via multi-technology handover controller 52. The target base station may receive the trial communication and then transmit a trial response in response to the trial communication. Even though the target base station receives the trial communication from the serving base station, the target base station may transmit the trial response directly to the mobile station (e.g., base station 28 may transmit the trial response to mobile station 20 over forward link 44). Thus, the mobile station may receive the trial response from the target base station, as indicated by block 306. With reference to FIG. 2, mobile station 20 may receive the trial response through second receiver 104.

Once the mobile station receives the trial response, the mobile station may evaluate the trial response to determine whether the trial response is acceptable, as indicated by block 308. To determine whether the trial response is acceptable, the mobile station may determine whether the content of the trial response is as expected. The mobile station may also evaluate the quality and/or timeliness of the trial response. With respect to quality, the mobile station may evaluate whether the trial response was received with any errors. With respect to timeliness, the mobile station may evaluate the delay between the time that the mobile station transmitted the trial communication to the serving base station and the time that the mobile station received the trial response from the target base station. The mobile station may also evaluate the type of modulation and/or encoding that the target base station used for the trial response and the signal strength at which the mobile station receives the trial response. The mobile station may also consider other factors in determining whether the trial response is acceptable.

If the trial response is acceptable, then the mobile station transmits a handover request to the serving base station, as indicated by block 310. Unlike the trial handover request of block 300, the handover request is a message that actually requests a handover of the communication session from the serving base station to the target base station. If the trial response is not acceptable, then the mobile station may select a different base station from the multi-technology neighbor list, as indicated by block 312. For example, if the mobile station has already generated a prioritized list of candidate base stations, the mobile station may select the next highest priority base station in the list.

Although FIG. 4 shows an example in which the mobile station transmits one trial communication and receives one response, it is to be understood that the mobile station could transmit multiple trial communications and/or receive multiple trial responses during the trial handover process. Thus, the determination of whether to request a handover of the communication session to the target base station or to select a different target base station may involve a determination of whether multiple trial responses are acceptable.

Figure 5:
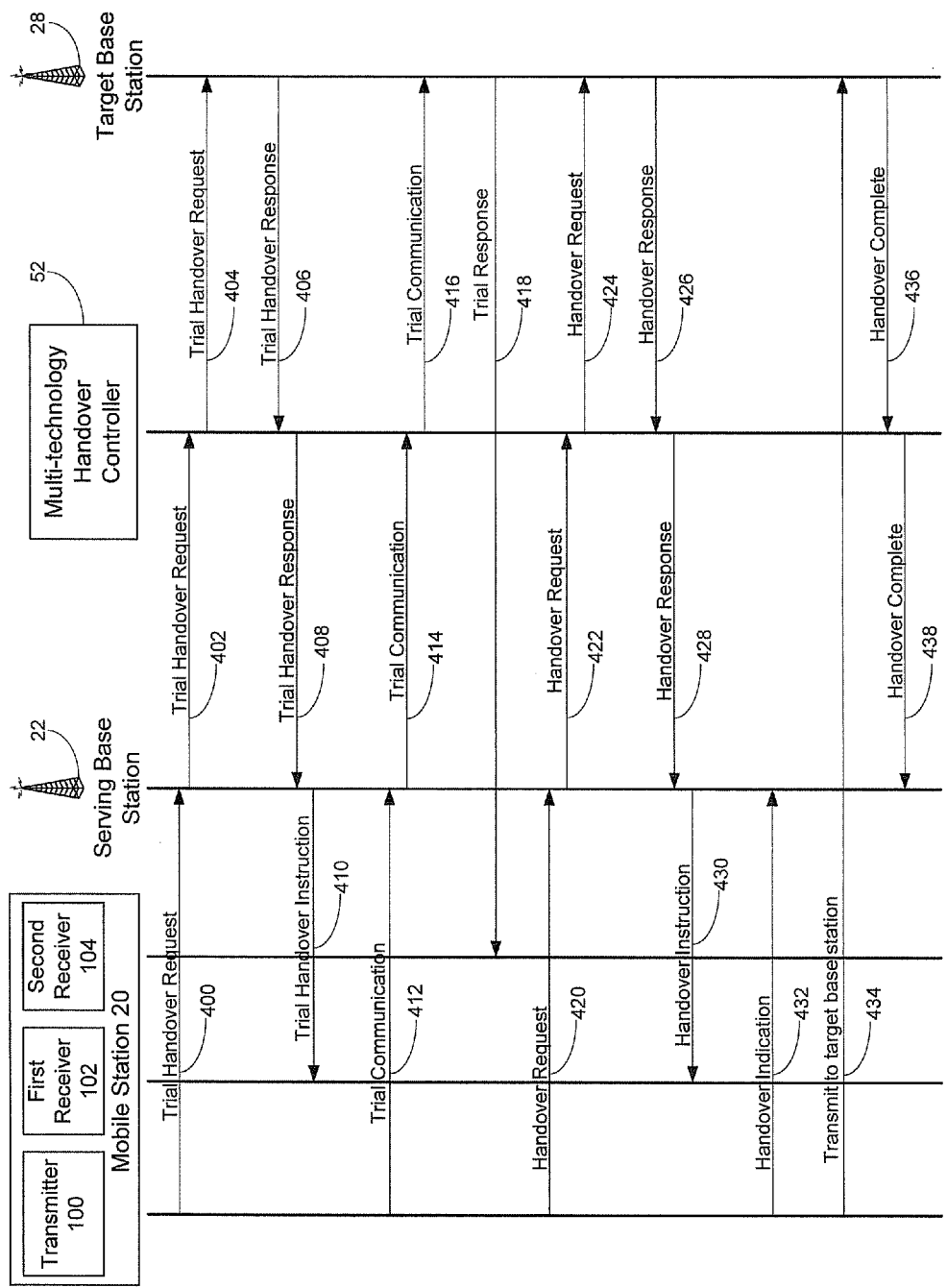
FIG. 5 is a call flow for a multi-technology handover method, in accordance with an exemplary embodiment.

As noted above, a network element, such as a multi-technology handover controller, may intermediate messaging between the serving base station and the target base station. FIG. 5 illustrates an exemplary call flow in which multi-technology handover controller 52 forwards messages between serving base station 22, which uses a first radio access technology, and target base station 28, which uses a second radio access technology. In this example, mobile station 20 is engaged in a communication session with serving base station 22 (e.g., using transmitter 100 and first receiver 102) and has already identified target base station 28 for a possible handover of the communication session. Thus, mobile station 20 may initiate a trial handover procedure to evaluate target base station 28 by transmitting a trial handover request 400 to serving base station 22.

Trial handover request 400 may identify mobile station 20 and the communication session and may identify target base station 28 as the base station to be evaluated by a trial handover procedure. The trial handover request 400 may also include parameters relating to the communication session that mobile station 20 is requesting with target base station 28. Thus, trial handover request 400 may include identifiers of mobile station 20, serving base station 22, target base station 28, along with requested parameters for the communication session, such as QoS or QCI parameters, frequencies, protocols, encoding parameters, bandwidths, and/or data rates.

In response, serving base station 22 may contact multi-technology handover controller 52 to route the trial handover request to target base station 28. For example, serving base station 22 may forward the trial handover request to multi-technology handover controller 52, as indicated by message 402. In response, multi-technology handover controller 52 may access base station information stored in database 56 to determine how to route the trial handover request. For example, multi-technology handover controller 52 may obtain a network address of target base station 28. Multi-technology handover controller 52 may then forward the trial handover request to target base station 28, as indicated by message 404.

When target base station 28 receives the trial handover request, target base station 28 may determine whether to accept the requested trial handover procedure. Target base station 28 may make this determination based on the information contained in the trial handover request and/or based on resources availability. For example, if target base station 28 is already heavily loaded and lacks sufficient resources to accept another communication session, then target base station 28 may deny the trial handover request.

In this case, however, it is assumed that target base station 28 has sufficient resources for the communication session and accepts the trial handover request. Thus, target base station 28 transmits a trial handover request 406 that indicates the acceptance of the trial handover by target base station 28. Multi-technology handover controller 52 may forward the trial handover response to serving base station 22, as indicated by message 408. In response, serving base station 22 may transmit a trial handover instruction 410 to mobile station 20. Trial handover instruction 410 may instruct mobile station 20 to begin the trial handover procedure.

In response to the trial handover instruction, mobile station 20 transmits a trial communication 412 to serving base station 22. Serving base station 22 may, in turn, forward the trial communication to multi-technology handover controller 52, as indicated by message 414. Multi-technology handover controller 52 may forward the trial communication to target base station 28, as indcted by message 416.

In response to receiving the trial communication, target base station 28 transmits a trial response 418 to mobile station 20, for example, over a forward link 44. Trial response 418 may indicate whether target base station 28 accepts or rejects the handover. Trial response 418 may also indicate whether target base station 28 accepts or rejected any of the requested parameters that may have been included in the trial communication. If target base station 28 does not accept a requested parameter, then trial response 418 may included one or more counter-proposed parameters in order to negotiate the parameters used for the communication session. Trial response 418 may also include a channel map, indicate whether multi-carrier support is available, and/or otherwise indicate what type of air interface target base station 28 is able to support.

Mobile station 20 may evaluate the trial response 418 to determine whether it is acceptable, i.e., whether the trial response justifies a handover of the communication session to target base station 28. If trial response 418 is acceptable, mobile station 20 may transmit a handover request 420 to serving base station 22. Handover request 420 may indicate that the trial handover was successful and may request a handover of the communication session to target base station 28. Serving base station 22 may forward the handover request to multi-technology handover controller 52, as indicated by message 422. Multi-technology handover controller 52 may forward the handover request to target base station 28, as indicated by message 424.

After receiving the handover request, target base station 28 may allocate resources for the communication session, such as a forward link channel and a reverse link channel. Target base station 28 may also transmit a handover response 426 indicating its acceptance of the handover of the communication session. Handover response 426 may include one or more parameters that mobile station 20 may use to effect the handover of the communication session to target base station 28. For example, handover response 426 may identify a forward link channel and a reverse link channel that target base station 28 allocated for the communication session. Multi-technology handover controller 52 may forward the handover response to serving base station 22, as indicated by message 428.

In response, serving base station 22 may transmit a handover instruction 430 to mobile station 20. Handover instruction 430 may instruct mobile station 20 to complete the handover of the communication session to target base station 28. Handover instruction 430 may also include the information provided by target base station 28 in the handover response, such as the forward link channel and reverse link channel that target base station 28 allocated for the communication session.

In response to handover instruction 430, mobile station 20 may transmit a handover indication 432 to serving base station 22 to confirm that mobile station 20 is proceeding with the handover of the communication session. To effect the handover, mobile station 20 may configure a transmitter and a receiver for the second radio access technology used by target base station 28. For example, with reference to FIG. 2, mobile station 20 may configure transmitter 100 for the second radio access technology (second receiver 104 may already have been configured for the second radio access technology in order to receive trial response 418).

Once transmitter 100 has been configured to use the second radio access technology, mobile station 20 may begin transmitting to target base station 28, as indicated by message 434. Target base station 28 may begin receiving transmissions from mobile station 20 and, in response, target base station 28 may transmit a handover complete indication 436. Multi-technology handover controller 52 may forward the handover complete indication to serving base station 22, as indicated by message 438. In response to the handover complete indication, serving base station 22 may de-allocate the resources that were used for the communication session. At this point, mobile station 20 may continue the communication session via target base station 28, using the second radio access technology. More particularly, mobile station 20 may continue the communication session via target base station 28, using one or more contiguous or non-contiguous frequency bands.

Although FIG. 5 illustrates an example in which the mobile station initiates a trial handover procedure, it is to be understood that a trial handover procedure could be initiated in other ways. For example, the serving base station may identify a target base station for handover over a communication session involving a mobile station and then initiate a trial handover procedure by transmitting a trial handover request to the target base station (e.g., via a multi-technology handover controller). If the target base station accepts, the target base station may transmit a trial handover response indicating that acceptance to the serving base station (e.g., via a multi-technology handover controller). In response, the serving base station may transmit a trail handover instruction to the mobile station, and the process may continue thereafter as illustrated in FIG. 5.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a mobile station, said mobile station having a transmitter, a first receiver, and a second receiver, said method comprising:

said mobile station using said transmitter and said first receiver to engage in a communication session via a serving base station, said serving base station using a first radio access technology;

said mobile station transmitting through said transmitter a trial communication to said serving base station, wherein said serving base station transfers at least said trial communication for delivery to a target base station in response to receiving said trial communication, wherein said target base station transfers a trial response in response to receiving at least said trial communication;

said mobile station receiving through said second receiver said trial response from said target base station, said target base station using a second radio access technology, wherein said trial response is a response to said trial communication; and after receiving said trial response, said mobile station transmitting through said transmitter a handover request to said serving base station, wherein said handover request is configured to request a handover of said communication session from said serving base station to said target base station.

2. The method of claim 1, further comprising:
said mobile station continuing said communication session via said target base station, using one or more contiguous or non-contiguous frequency bands.

3. The method of claim 1, further comprising:
said mobile station receiving through said first receiver a trial handover instruction from said serving base station, wherein said mobile station transmits said trial communication to said serving base station in response to said trial handover instruction.

4. The method of claim 1, further comprising:
said mobile station determining whether said trial response is acceptable, wherein said mobile station transmits said handover request in response to determining that said trial response is acceptable.

5. The method of claim 1, further comprising:
said mobile station receiving a multi-technology neighbor list, wherein said multi-technology neighbor list identifies a plurality of neighboring base stations and a plurality of radio access technologies used by said plurality of neighboring base stations, said plurality of neighboring base stations including said target base station.

6. The method of claim 5, further comprising:
said mobile station detecting degradation in quality of said communication session via serving base station;
in response to said detected degradation, said mobile station transmitting through said transmitter a neighbor list request to said serving base station.

7. The method of claim 6, further comprising:
said mobile station receiving through said first receiver a response to said neighbor list request from said serving base station, said response including said multi-technology neighbor list.

8. The method of claim 6, wherein said neighbor list request identifies a location of said mobile station.

9. The method of claim 5, further comprising:
said mobile station selecting said target base station from among said plurality of neighboring base stations identified in said multi-technology neighbor list.

10. The method of claim 9, wherein said mobile station selecting said target base station from among said plurality of neighboring base stations comprises:
said mobile station applying a selection policy.

11. The method of claim 9, wherein said mobile station selecting said target base station from among said plurality of neighboring base stations comprises:
said mobile station querying a policy-function network entity.

12. The method of claim 9, further comprising:
after selecting said target base station, said mobile station using said second receiver to obtain a measured signal strength of said target base station.

13. The method of claim 12, further comprising:
said mobile station comparing said measured signal strength to a threshold signal strength; and in response to said measured signal strength exceeding said threshold signal strength, said mobile station transmitting through said transmitter a trial handover request to said serving base station.

14. The method of claim 13, further comprising:
said mobile station receiving a trial handover instruction in response to said trial handover request; and
said mobile station transmitting said trial communication in response to said trial handover instruction.

15. A mobile station, comprising:
a transmitter that can be configured to use at least a first radio access technology and a second radio access technology;
a first receiver that can be configured to use at least said first radio access technology and said second radio access technology;
a second receiver that can be configured to use at least said first radio access technology and said second radio access technology; and
a controller, wherein said controller is configured to control said transmitter and said first receiver to use said first radio access technology for a communication session via a serving base station and to control said second receiver to use a second radio access technology to evaluate a target base station for handover of said communication session;
wherein said controller is configured to evaluate said target base station by transmitting through said transmitter, using said first radio access technology, a trial communication to said first base station; receiving through said second receiver, using said second radio access technology, a trial response from said target base station, wherein said trial response is a response to said trial communication; and determining whether said trial response is acceptable; and
in response to determining that said trial response is acceptable, said controller is further configured to transmit through said transmitter, using said first radio access technology, a handover request to said serving base station, wherein said handover request is configured to request a handover of said communication session from said serving base station to said target base station.

\* \* \* \* \*